US008543857B2

(12) United States Patent
Therien

(10) Patent No.: US 8,543,857 B2
(45) Date of Patent: Sep. 24, 2013

(54) METHOD AND APPARATUS FOR LOW POWER OPERATION OF MULTI-CORE PROCESSORS

(75) Inventor: Guy M. Therien, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 12/567,755

(22) Filed: Sep. 26, 2009

(65) Prior Publication Data

US 2011/0078469 A1 Mar. 31, 2011

(51) Int. Cl.
*G06F 1/00* (2006.01)

(52) U.S. Cl.
USPC ........... 713/324; 713/300; 713/320; 713/322; 713/323; 718/100; 718/102; 718/104

(58) Field of Classification Search
USPC ......... 713/300, 320, 322, 323, 324; 718/100, 718/102, 104
See application file for complete search history.

(56) References Cited

U.S. PATENT DOCUMENTS

| | | | |
|---|---|---|---|
| 6,901,522 B2 | 5/2005 | Buch | |
| 7,287,254 B2 * | 10/2007 | Miller et al. | 718/102 |
| 7,389,506 B1 * | 6/2008 | Miller et al. | 718/1 |
| 8,010,822 B2 * | 8/2011 | Marshall et al. | 713/324 |
| 2009/0187909 A1 * | 7/2009 | Russell et al. | 718/102 |
| 2010/0332869 A1 * | 12/2010 | Hsin et al. | 713/320 |
| 2011/0022870 A1 * | 1/2011 | McGrane et al. | 713/340 |

FOREIGN PATENT DOCUMENTS

| | | |
|---|---|---|
| JP | 2006-236159 | 9/2006 |
| JP | 2006319670 | 11/2006 |
| JP | 2009-17044 | 1/2009 |

OTHER PUBLICATIONS

Satoshi Yamada, et al., "Evaluation on scheduler of context aware aggregation to processor", IPSJ SIG Technical Report, vol. 2007, No. 10 (2007-OS-104), Information Processing Society of Japan, Jan. 31, 2007, pp. 41-48, ISSN: 0919-6072.

Jun Kanai, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86, ISSN: 1344-0640.

Kalen Delaney, et al., "Inside Microsoft SQL Server 2005 Query tuning & Optimization" translated by Opus One Co., Ltd., First edition, Nikkei BP SoftPress, Jun. 30, 2008, pp. 14-16, 205-208, ISBN: 978-4-89100-590-0.

Shinji Shiota, et al., "St. Vista School", Weekly ASCII, issue of Feb. 24, 2009 (vol. 724), ASCII Media Works, Feb. 24, 2009, p. 58.

Jeffrey Richter, et al., "Advanced Windows, 5th, First volume" translated by QUIPU, Co., Ltd., First edition, Nikkei BP SoftPress, Oct. 27, 2008, pp. 251-256, ISBN: 978-4-89100-592-4.

(Continued)

*Primary Examiner* — Jaweed A Abbaszadeh
(74) *Attorney, Agent, or Firm* — Kacvinsky Daisak PLLC

(57) ABSTRACT

Embodiments of an apparatus, system and method are described for low power operation of a multi-core processing system. An apparatus may comprise, for example, a power management module operative to initialize a low power mode, detect one or more un-affinitized software threads, and affinitize the one or more un-affinitized software threads to run on a set of processor cores of a multi-core processor, wherein the set of processor cores comprises less than a total number of processor cores of the multi-core processor. Other embodiments are described and claimed.

17 Claims, 4 Drawing Sheets

(56) References Cited

OTHER PUBLICATIONS

First Office Action, Japanese Patent Application No. 2010-202814, dated Mar. 21, 2012, 9 pgs. (translated).

Office Action received for Japanese Patent Application No. 2010-202814, mailed Mar. 5, 2013, 13 pages including 6 pages English translation.

Coskun, A.K., et.al., "Evaluating the Impact of Job Scheduling and Power Management on Processor Lifetime for Chip Multiprocessors", Proc. of the 11th Int. Joint Conf. on Measurement and modeling of computer systems (SIGMETRICS '09), Jun. 2009, p. 169-180, ISBN:978-1-60558-511-6.

Office Action received for Chinese Patent Application No. 201010293647.X, mailed Jun. 20, 2013, 14 pages including 7 pages English translation.

* cited by examiner

METHOD AND APPARATUS FOR LOW POWER OPERATION OF MULTI-CORE PROCESSORS

BACKGROUND

The performance of modern computing systems has increased rapidly in recent years. One particular area in which performance has evolved is processor technology. Many processors in computing system today include a plurality of cores. The increase in processing power provided by multi-core processors has also resulted in increased power consumption and heat generation for computing systems that continue to decrease in size. As the processing power and number of cores in multi-core processors continues to increase, reductions in power consumption and heat generation become important considerations. As a result, it is desirable to adapt multi-core processors, when possible, to conserve power and reduce heat generation. Consequently, there exists a substantial need for techniques to scale power consumption and heat generation for multi-core processor systems.

DETAILED DESCRIPTION

Figure 1:
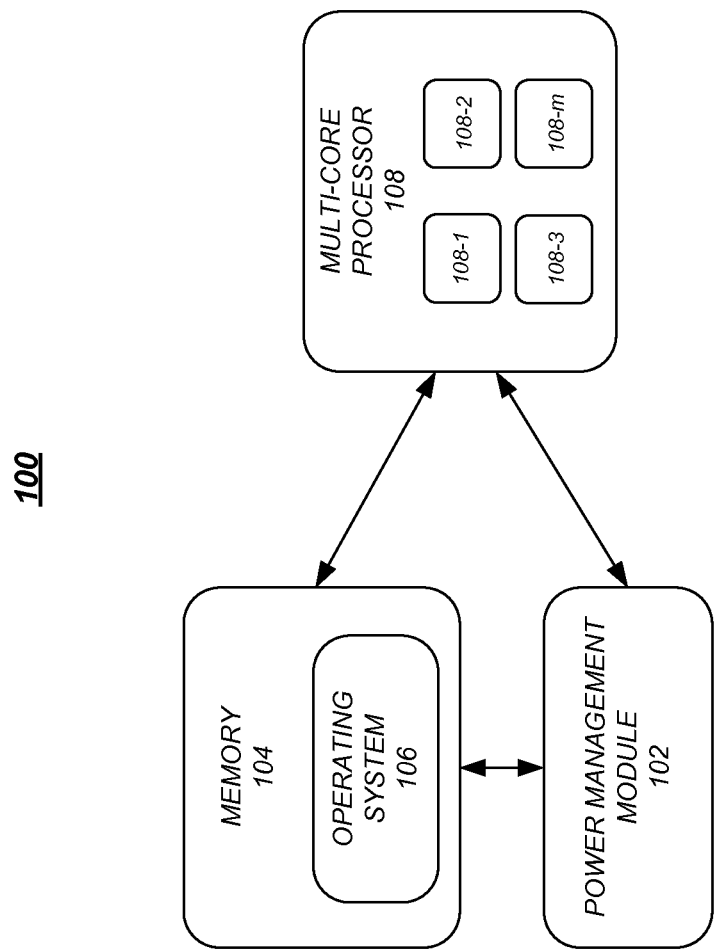
FIG. 1 illustrates one embodiment of an apparatus.

The embodiments are generally directed to techniques designed to reduce power consumption and heat generation in computing systems utilizing multi-core processors. Various embodiments provide techniques that include a power management module to initialize a low power mode for a computing system, detect one or more un-affinitized software threads, and affinitize the one or more un-affinitized software threads to run on a set of processor cores of a multi-core processor, wherein the set of processor cores comprises less than a total number of processor cores of the multi-core processor. Other embodiments are described and claimed.

With the progression over time toward the use of multi-core processors, power consumption when running active workloads has steadily risen. While multi-core processors have delivered significant performance advantages, the associated power consumption when running active workloads has caused computing systems to operate at higher temperatures and to generate more noise due to the use of fans and other cooling devices during operation. Additionally, many popular modern operating systems do not provide a means to add and remove processor cores on the fly. Furthermore, the addition and removal of processors often comprises a high overhead operation, whereas forced-affinitization, for example, often comprises a lower overhead operation.

In conventional computing systems, the only means available to reduce power consumption currently may be to force all cores of a multi-core processor to lower performance states (e.g. P-states) and to then throttle the cores to try and maintain power and/or temperature below a certain level. With multi-core operation, the maximum amount of throttling available is often insufficient to reduce the power consumption to reach a cool and quiet threshold as clocked core leakage may be significant. In conventional computing systems, the only means available to reduce power further may be to arrange the core in a low power or un-clocked state. As such, there exists no efficient means today to limit power consumption of multi-core processors that are executing active workloads. Consequently, various embodiments described herein provide an efficient means to reduce multi-core processor power consumption and heat generation when executing active workloads thus enabling cool and quiet operation of multi-core processor systems.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates one embodiment of an apparatus. FIG. 1 illustrates a block diagram of an apparatus 100. Apparatus 100 may comprise a computing system in some embodiments. As shown in FIG. 1, apparatus 100 comprises multiple elements, such as power management module 102, memory 104, operating system 106 and multi-core processor 108 including cores 108-1-m. The embodiments, however, are not limited to the elements or the configuration shown in this figure.

In various embodiments, multi-core processor 108 may comprise a central processing unit comprising one or more processor cores 108-1-m. The processor 108 may include any type of processing unit, such as, for example, CPU, multi-processing unit, a reduced instruction set computer (RISC), a processor that have a pipeline, a complex instruction set computer (CISC), digital signal processor (DSP), and so forth.

In various embodiments, memory 104 may comprise any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Operating system (OS) 106 may comprise an interface between various hardware components of apparatus 100 and a user in some embodiments. In various embodiments, OS 106 may be responsible for the management and coordination of activities and the sharing of the resources of the computing system 100. In some embodiments, OS 106 may act as a host for a variety of computing applications run on computing system 100. For example, OS 106 may comprise a Windows© operating system by Microsoft Corporation© of Redmond, Wash. in some embodiments. Other embodiments are described and claimed.

In various embodiments, power management module 102 may comprise a software driver or application to mange power and heat generation for computing system 100. In some embodiments, power management module 102 may comprise a software driver running under OS 106 that controls entry into and management of a specific power plan, such as a cool and quite power plan or a low power plan for example. The low power plan may comprise a configurable plan that reduces processor power consumption during active workloads in various embodiments. It should be understood that while power management module 102 is shown as a separate component in computing system 100, it may be included in memory 104, as part of OS 106 or in any other location or configuration and still fall within the described embodiments. Other embodiments are described and claimed.

In some embodiments, power management module 102 may be operative to initialize a low power mode for computing system 100. Low power mode (or cool and quiet mode) may comprise a configurable power plan that is adapted to allow computing system 100 to operate with reduced power consumption, reduced heat generation and reduced noise as compared to a normal or conventional operating mode.

Initialization of low power mode may result from a button press by a user or the entry into a specific power plan based on detected system performance and/or system or component conditions. For example, in some embodiments, power management module 102 may receive information related to the power consumption and/or the heat or noise level currently being generated by various components of computing system 100 and may automatically enter into low power mode. In some embodiments, a user may manually initiate low power mode by pressing a button, either in hardware or software, to enable low power mode or by enabling or activating a low power mode system preference. Other embodiments are described and claimed.

In various embodiments, power management module 102 may monitor active workloads and reallocate certain workloads upon entering into low power mode. For example, power management module 102 may monitor software threads associated with one or more active applications running on computing system 100. Software threads may comprise, for example, instructions that are executed to perform tasks. In some embodiments, in a multi-core system such as computing system 100, the threads or tasks may run at the same time (e.g. in parallel), with each processor 108 or each processor core 108-1-m running a particular thread or task. While some conventional computing systems do contain the ability to affinitize threads, this ability is not typically implemented as specialized system knowledge is often required to achieve any substantial benefit. In many conventional systems, most applications do not affinitize their tasks to specific processors. For example, in conventional systems, an OS scheduler may simply run a software threads on logical processors at its discretion. Stated differently, an OS scheduler in a conventional computing system may schedule threads to run on all available logical processors (e.g. processor cores 108-1-m, for example).

Power management module 102 may be operative to detect one or more un-affinitized software threads in some embodiments. For example, power management module 102 may continuously monitor an OS environment, such as OS 106 for example, for thread creation, deletion, and/or mode changes, and may identify threads that are not affinitized and are not otherwise exempt or excluded from affinitization. In various embodiments, power management module 102 may by operative to affinitize the one or more un-affinitized software threads to run on a set of processor cores of multi-core processor 108. For example, power management module 102 may affinitize one or more un-affinitized software threads to run on less than a total number of processor cores of the multi-core processor 108. Other embodiments are described and claimed.

In some embodiments, power management module 102 may continuously affinitize all un-affinitized software threads to a configured specific set of logical processors when in the low power mode. In various embodiments, when the processor topology is known, the set of processor cores that the software threads are affinitized to run on can be set or selected so as to exclude logical processors associated with specific physical processor cores. For example, power management module 102 may be operative to detect power characteristics or thermal characteristics for each of the processor cores 108-1-m of the multi-core processor 108 and select the set of processor cores used for affinitization based on the power characteristics or thermal characteristics.

In some embodiments, when the OS scheduler ceases to schedule work on certain cores as a result of invocation of the low power mode, the cores naturally become idle and enter processor low power states. While this may, for example, result in higher utilization on a fewer number of processor cores, the overall performance of computing system 100 may be reduced along with power consumption, heat generation and noise generation. Moreover, in some embodiments, power management module 102 may be operative to successively reduce the number of processor cores in the selected set of processor cores and affinitize the one or more un-affinitized software threads to run on the reduced set of processor cores to continually reduce power consumption and heat and noise generation. Other embodiments are described and claimed.

In various embodiments, the lowest power operation for a computing system may be invoked by affinitizing all software threads to one processor core, effectively emulating that which would be achieved by a processor hot remove operation. For example, power management module 102 may be operative to affinitize the one or more un-affinitized software threads to run on one of the plurality of processor cores 108-1-m of the multi-core processor 108 in some embodiments.

Affinitizing all software threads to one processor core may result in reduced power consumption and heat and noise generation for computing system 100. In some embodiments, however, power consumption and heat and noise generation may be further reduced by reducing OS 106 usage of processor performance states to a configured number of lower performance states once effective single core operation has been achieved. For example, the power management module 102 may be operative to reduce processor performance states for one or more of the processor cores 108-1-m in the set of processor cores selected for thread affinitization. In various embodiments, lower power operation may be achieved by limiting OS P-state usage to the single lowest power P-state for the remaining core(s). Other embodiments are described and claimed.

In some embodiments, further active workload power reduction may be achieved using linear throttling after all threads have been affinitized to execute on a single processor core and that core is operating at its lowest P-state. For example, power management module 102 may be operative to apply linear throttling to one or more of the processor cores in the set of processor cores. In various embodiments, however, the linear throttling operation itself may have a power cost that effects system performance. As a result, utilization may be detected and throttling may be applied only when utilization rises above a configurable threshold, for example. For example, power management module 102 may be operative to apply the linear throttling based on a utilization threshold. In some embodiments, the utilization threshold may be set at the point of positive return for the system (e.g. the point where throttling will reduce power, not increase it).

Figure 2:
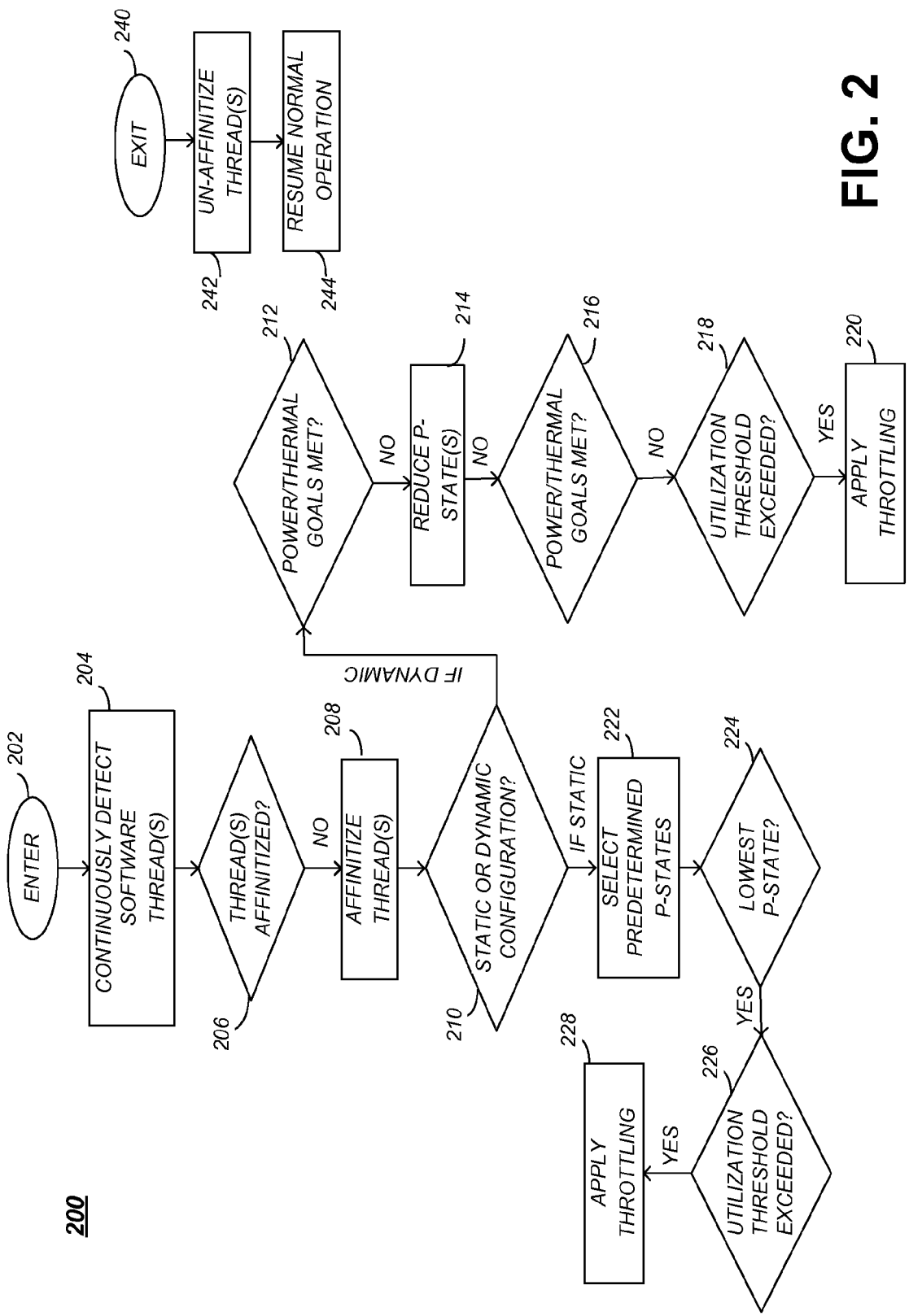
FIG. 2 illustrates one embodiment of a first logic diagram.

FIG. 2 illustrates one embodiment of a logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe the power saving features described above with reference to apparatus 100 and power saving module 102.

In various embodiments, a low power mode may be entered or initialized at 202. For example, a user may select a low power mode by pressing a button or otherwise indicating a desire to enter a low power mode on a computing system. At 204, one or more software threads may be detected. For example, a device driver or other application program may be configured to continuously monitor for and detect software threads scheduled for execution by a multi-core processor. At 206, a determination is made whether or not the detected software threads are affinitized. If one or more threads are already affinitized or are otherwise except or excluded from affinitization, the affinitization of these threads is not altered. If no un-affinitized threads are detected, continual monitoring and detection of software threads may occur.

In some embodiments, if one or more threads are not affinitized and are not exempt or excluded from affinitization, the threads may be affinitized at 206. For example, the un-affinitized threads may be scheduled for execution on less than a total number of available cores of a multi-core processor. Following the forced affinitization of the detected un-affinitized threads, a determination is made at 210 whether a static or dynamic configuration is enabled and/or desired. For example, a static configuration may be selected that includes predetermined performance criteria or a dynamic configuration may be selected that includes performance goals that are met regardless of the resulting configuration. Other embodiments are described and claimed.

If the static configuration is selected, predetermined performance states (e.g. P-states) are selected for the remaining processors or processor cores at 222. At 224, a determination is made whether the lowest P-state has been selected, and if so, a determination is made at 226 as to whether a utilization threshold has been met. If so, throttling may be applied at 228. Other embodiments are described and claimed.

In various embodiments, if the dynamic confirmation is selected, a determination is made at 212 whether more power savings are desired or if established thermal or acoustic goals have been satisfied. If additional power savings are desired or goals have not been met, performance states (e.g. P-states) for the cores selected for the affinitization of the software threads may be reduced at 214. In various embodiments, a determination is made at 216 if further power savings are desired or if power, thermal or acoustic goals have still not been met. If additional power savings are desired or goals have not been met, a determination whether or not a utilization threshold has been exceeded is made at 218 and, if so, linear throttling may be applied at 220.

In some embodiments, the dynamic configuration may include affinitizing the threads to utilize logical processor successively until the goals are met. For example, they dynamic configuration may involve a successive reduction in the number of cores that are utilized until the goals are met. Other embodiments are described and claimed.

In various embodiments, the low power mode may be exited at any time for any number of reasons, including but not limited to, user selected exit or performance based exit, for example. In some embodiments, exit from the low power mode may be detected at 240. In various embodiments, the exit may occur in the dynamic configuration when the throttling and P-states and core usage is backed out and/or when the goals have been reached, for example. In the event of exit from low power mode, the affinitized threads may be un-affinitized at 242 and the system may resume normal operation at 244. Other embodiments are described and claimed.

While certain embodiments are described in terms of a software thread, it should be understood that any number of threads and any number of cores of a multi-core processor can be used and still fall within the described embodiments. Furthermore, it should be understood that in some embodiments that logic flow 200 may be implemented or arranged to perform tasks in parallel, including processing a plurality of threads and controlling a plurality of cores at substantially the same time. Moreover, it should also be understood that the logic flow 200 is only one example of a logic flow and that different numbers, orders and/or arrangements of the operations described in logic flow 200 could be implemented and still fall within the described embodiments. Other embodiments are described and claimed.

Figure 3:
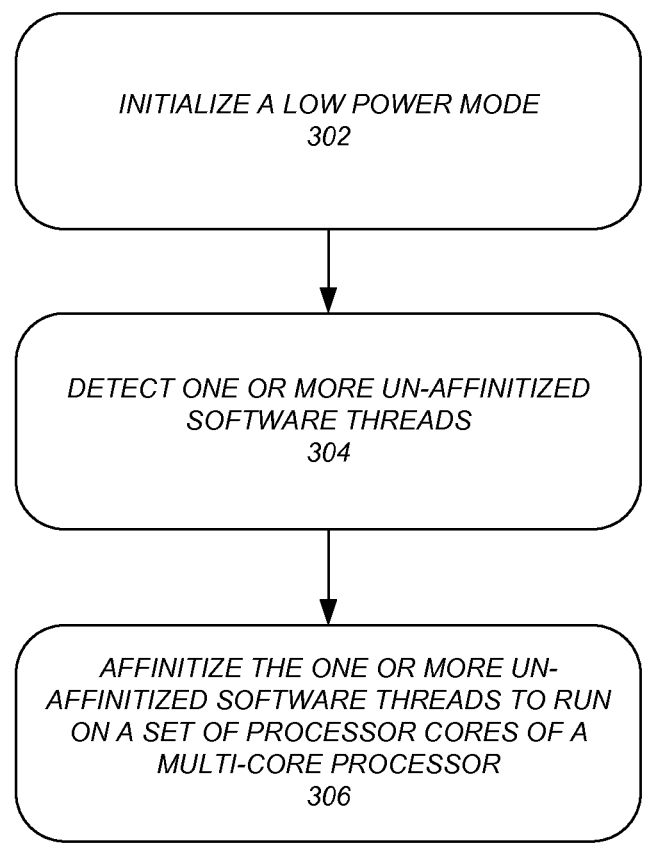
FIG. 3 illustrates one embodiment of a second logic diagram.

FIG. 3 illustrates one embodiment of a second logic flow 300. As described above with reference to logic flow 200, the logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor).

In one embodiment, a low power mode may be initialized at 302. For example, power management module 102 may initialize a low power or cool and quiet operational mode for computing system 100. At 302 one or more un-affinitized software threads may be detected. For example, power management module 102 may detect one or more un-affinitized software threads that are scheduled for execution by multi-core processor 108.

In various embodiments, the one or more un-affinitized software threads may be affinitized to run on a set of processor cores of a multi-core processor at 306. In some embodiments, the set of processor cores comprises less than a total number of processor cores of the multi-core processor. For example, in one embodiment, the one or more un-affinitized software threads may be affinitized to run on one of the plurality of processor cores 108-1-m of the multi-core processor 108. Other embodiments are described and claimed.

In some embodiments, power characteristics and/or thermal characteristics may be detected for each of the processor cores of the multi-core processor and the set of processor cores may be selected based on the power characteristics and/or thermal characteristics. For example, power management module 102 may monitor various computing system 100 components and select the set of processor cores 108-1-m used for software thread affinitization based on characteristics of the components.

In various embodiments, the number of processor cores in the set of processor cores may be successively reduced and the one or more un-affinitized software threads may be affinitized to run on the reduced set of processor cores. For example, power management module 102 may be operative to continually monitor multi-core processor 108 and any software threads being executed by or scheduled for execution by multi-core processor 108 and, when warranted, may further reduce the set of selected cores used for software thread affinitization.

In some embodiments, when further power savings are desired in addition to the savings achieved using thread affinitization, performance states for one or more of the processor cores in the set of processor cores may be reduced. For example, if a single core of multi-core processor 108 is being used to execute a plurality of software threads, additional power savings may be achieved by reducing the P-state of the single core. Still further power savings may be achieved if linear throttling is applied to one or more of the processor cores in the set of processor cores. In various embodiments, the linear throttling is applied based on a utilization threshold. Other embodiments are described and claimed.

Figure 4:
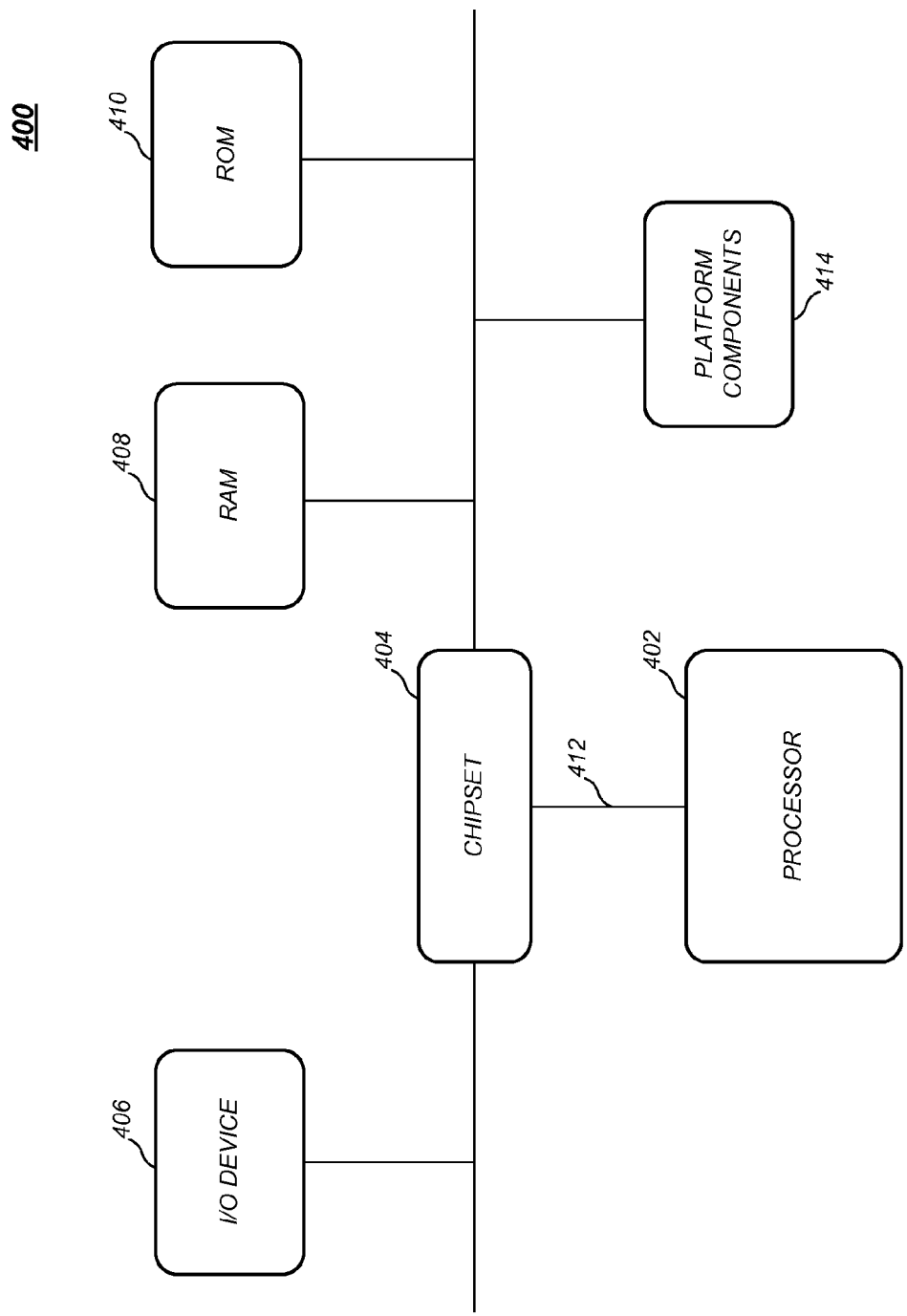
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving a request to enter a low power mode;
continuously detecting one or more un-affinitized software threads for an active workload in the low power mode;
detecting power or thermal characteristics for each of a plurality of cores of a multi-core processor;
selecting a set of processor cores based on the detected power or thermal characteristics;
continuously affinitizing the one or more detected un-affinitized software threads for the active workload to run on the selected set of processor cores of the multi-core processor, the selected set of processor cores comprising less than a total number of processor cores of the multi-core processor;
successively reducing the number of processor cores in the set of processor cores;
affinitizing the one or more un-affinitized software threads to run on the reduced set of processor cores; and
reducing processor performance states for one or more of the processor cores in the set of processor cores.

2. The method of claim 1, comprising:
applying linear throttling to one or more of the processor cores in the set of processor cores.

3. The method of claim 2, comprising:
applying the linear throttling based on a utilization threshold.

4. The method of claim 1, comprising:
affinitizing the one or more un-affinitized software threads to run on one of the plurality of processor cores of the multi-core processor.

5. An apparatus, comprising:
a power management module operative to receive a request to enter a low power mode, continuously detect one or more un-affinitized software threads for the low power mode, to detect power or thermal characteristics for each of a plurality of cores of a multi-core processor, to select a set of processor cores based on the detected power or thermal characteristics, to continuously affinitize the one or more detected un-affinitized software threads for the active workload to run on the selected set of processor cores of the multi-core processor, the selected set of processor cores comprising less than a total number of processor cores of the multi-core processor, to successively reduce the number of processor cores in the set of processor cores, to affinitize the one or more un-affinitized software threads to run on the reduced set of processor cores, and to reduce processor performance states for one or more of the processor cores in the set of processor cores.

6. The apparatus of claim 5, wherein the power management module is operative to apply linear throttling to one or more of the processor cores in the set of processor cores.

7. The apparatus of claim 6, wherein the power management module is operative to apply the linear throttling based on a utilization threshold.

8. The apparatus of claim 5, wherein the power management module is operative to affinitize the one or more un-affinitized software threads to run on one of the plurality of processor cores of the multi-core processor.

9. An article comprising a computer-readable storage medium containing instructions that if executed by a processor enable a system to:
receive a request to enter a low power mode;
continuously detect one or more un-affinitized software threads for a low power mode;
detect power or thermal characteristics for each of a plurality of cores of a multi-core processor;
select a set of processor cores based on the detected power or thermal characteristics;
continuously affinitize the one or more detected un-affinitized software threads to run on the selected set of processor cores of the multi-core processor, wherein the selected set of processor cores comprises less than a total number of processor cores of the multi-core processor; successively reduce the number of processor cores in the set of processor cores;

affinitize the one or more un-affinitized software threads to run on the reduced set of processor cores; and reducing processor performance states for one or more of the processor cores in the set of processor cores.

10. The article of claim 9, comprising instructions that if executed enable the system to apply linear throttling to one or more of the processor cores in the set of processor cores.

11. The article of claim 10, comprising instructions that if executed enable the system to apply the linear throttling based on a utilization threshold.

12. The article of claim 9, comprising instructions that if executed enable the system to affinitize the one or more un-affinitized software threads to run on one of the plurality of processor cores of the multi-core processor.

13. A system, comprising:
a multi-core processor; and
a power management module operative to receive a request to enter a low power mode, continuously detect one or more un-affinitized software threads for a low power mode, to detect power or thermal characteristics for each of a plurality of cores of a multi-core processor, to select a set of processor cores based on the detected power or thermal characteristics, to continuously affinitize the one or more detected un-affinitized software threads to run on the selected set of processor cores of the multi-core processor, the selected set of processor cores comprising less than a total number of processor cores of the multi-core processor, to successively reduce the number of processor cores in the set of processor cores, to affinitize the one or more un-affinitized software threads to run on the reduced set of processor cores, and to reduce processor performance states for one or more of the processor cores in the set of processor cores.

14. The system of claim 13, wherein the power management module is operative to apply linear throttling to one or more of the processor cores in the set of processor cores.

15. The system of claim 14, wherein the power management module is operative to apply the linear throttling based on a utilization threshold.

16. The system of claim 13, wherein the power management module is operative to affinitize the one or more un-affinitized software threads to run on one of the plurality of processor cores of the multi-core processor.

17. The system of claim 13, comprising:
a volatile memory to store the power management module.

* * * * *

UNITED STATES PATENT AND TRADEMARK OFFICE
CERTIFICATE OF CORRECTION

| | | |
|---|---|---|
| PATENT NO. | : 8,543,857 B2 | Page 1 of 1 |
| APPLICATION NO. | : 12/567755 | |
| DATED | : September 24, 2013 | |
| INVENTOR(S) | : Guy M. Therien | |

It is certified that error appears in the above-identified patent and that said Letters Patent is hereby corrected as shown below:

In the Claims

In column 11, line 23, in claim 13, delete "continously" and insert -- continuously --, therefor.

In column 12, line 2, in claim 13, delete "continously" and insert -- continuously --, therefor.

Signed and Sealed this
Tenth Day of December, 2013

Margaret A. Focarino
*Commissioner for Patents of the United States Patent and Trademark Office*